Jan. 30, 1940.　　　　J. G. MÉJEAN　　　　2,188,609

FLUID DISTRIBUTING DEVICE

Original Filed Dec. 23, 1935

Inventor:
Jacques Gustave Méjean
Bailey & Larson
Attorneys

Patented Jan. 30, 1940

2,188,609

UNITED STATES PATENT OFFICE 2,188,609

FLUID DISTRIBUTING DEVICE

Jacques Gustave Méjean, Chatou, France, assignor to Societe Bronzavia, Courbevoie (Seine) France, a society of France Application December 23, 1935, Serial No. 55,908. Renewed June 26, 1939. In Belgium June 14, 1935

6 Claims. (Cl. 137—153)

The present invention relates to apparatus of the kind intended to feed a fluid at a variable rate automatically in accordance with the variations of the pressure of the surrounding medium, which pressure acts on deformable elements, such for instance as deformable boxes, which themselves control distributing devices cooperating with the fluid pipes. The invention is more especially, although not exclusively, concerned with oxygen inhalers for use on aircrafts for supplying pilots and passengers with an addition of oxygen which is variable in accordance with a change in the altitude.

The object of the present invention is to provide apparatus of this kind which are better adapted to meet the requirements of practice than similar apparatus used up to the present time, and, more especially to provide, apparatus by means of which the curve of variation of the rate of feed that corresponds to every specific application can be adjusted very accurately.

The essential feature of the present invention consists, in controlling the distributing or feed regulator of said apparatus, in order to obtain the automatic variation of the rate of feed and in controlling said regulator not directly by means of the boxes or other deformable elements in accordance with the pressure of the surrounding medium, but through the medium of kinematic means (cams, levers, etc.) which permits the distributing organ or device to operate according to a law which complies exactly with the predetermined law of variation of the feed.

According to another feature of the present invention, I provide, between the distributing or feed regulating device and its automatic control system, a unidirectional connection whereby it is possible to act manually on said device whenever it is desired to obtain a rate of feed different from that imposed by said control system.

Still another feature of the present invention, preferably to be used in combination with the above stated features, consists in combining with an apparatus of the type above mentioned checking means for ascertaining, especially on the ground level if an apparatus such as an oxygen inhaler for aircrafts is used whether said apparatus is truly capable of supplying the fluid in accordance with the predetermined law within the limits of variation of the surrounding pressure to be considered.

Other features of the present invention will result from the following detailed description of some specific embodiments thereof.

A preferred embodiment of the present invention will be hereinafter described with reference to the accompanying drawing, given merely by way of example, and in which.

Figure 1:
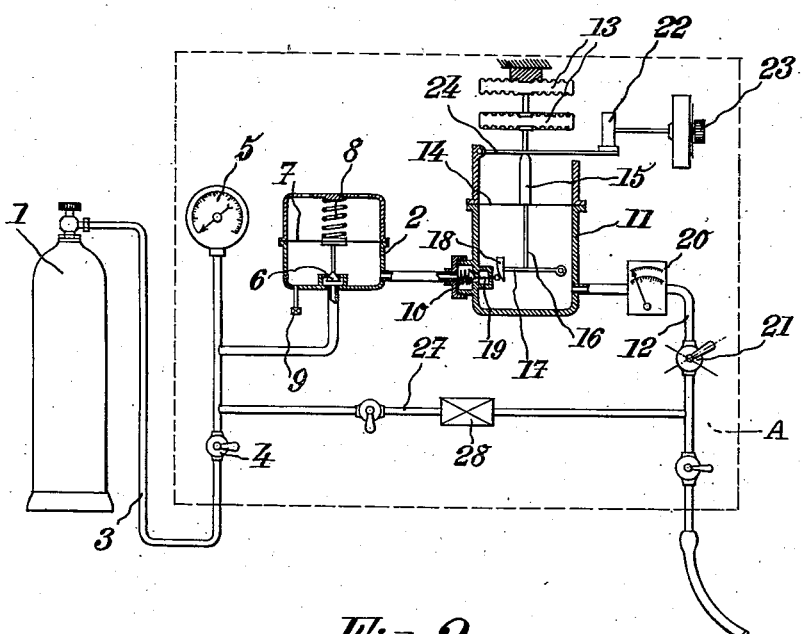
Fig. 1 shows a diagram of an oxygen inhaler made according to the present invention.

The specific example shown by the drawing relates to the case of an oxygen inhaler for use in an aircraft which must be capable of compensating the losses as the pressure is decreasing with the altitude, which therefore requires that the apparatus should supply oxygen at a rate of feed which is variable depending on the altitude, in accordance with a predetermined law.

The general arrangement of this apparatus is of the usual type, that is to say it includes one or several expansion stages capable of bringing the fluid, which is supplied by an oxygen bottle 1 in which it is stored at a high pressure (say 150 kgs.) to a distributing and feed regulating device at a reduced pressure (for instance 5 kgs).

For instance, as shown by the drawing, I provide, in front of said device a single expansion device, which consists of a vessel 2, to which the fluid from bottle 1 is fed through a pipe 3 which is provided with a starting valve 4 and a pressure gauge 5. Said fluid enters vessel 2 through an expansion valve 6, controlled for instance by a membrane 7 which is subjected, on its respective faces, to the pressure in the first stage and the pressure of the surrounding medium, these two pressures being balanced by a loaded spring 8.

From this expansion device, which is advantageously provided with a safety valve 9, the fluid passes at a pressure of 5 kilogrammes to the distributing and feed regulating device, consisting of a valve 10 shown as being spring pressed to closed position or any other throttling means, and then to a second expansion device 11 from which it flows out through a pipe 12 to which the breathing mask is to be fitted.

In apparatus of this kind as were previously made, the throttling element was directly operated by a control system responsive to variations of the pressure of the surrounding medium. Consequently, it was not possible to obtain the correct variation of the rate of feed in accordance with the altitude, and, as a matter of fact, the rate of feed did not increase sufficiently when the altitude increased.

According to the present invention, instead of acting directly on said throttling element, I interpose, between said valve 10 or its equivalent and the system by which it is controlled, special kinematic means, that is to say means devised in such manner that the predetermined law of variation may be exactly complied with.

If, for example, the control system or means consists of a set of deformable boxes 13 located on the outside of expansion device 11 which acts on the valve through a deformable membrane 14, said kinematic means may be devised according to the arrangement shown in Fig. 1, that is, the means are located partly on the inside, and partly on the outside of the expansion device.

The kinematic means above referred to may consist of any system of levers, cams, or combinations of cams and levers. Said means must be arranged in such manner that the drop of pressure which normally occurs in the expansion device and in pipe 12 is taken into consideration and that by the lift of the valve, that is by its section of flow and the corresponding drop of pressure, the correct rate of feed for each value of the pressure of the surrounding medium is obtained. It is clear that, for someone skilled in the art, it is possible to determine, either by calculation or experimentally, the conditions under which this result can be obtained.

By a particularly simple embodiment, shown by the drawing, the movement of deformable boxes 13 which are connected to membrane 14, is transmitted through a rod 15, to levers 16, 17 and a cam 18 which is secured to lever 17 and cooperates with a rod 19 which is connected with valve 10. By determining in a suitable manner the outline of cam 18 it is possible to comply exactly with the desired law of variation.

The system above described preferably further includes, on the one hand, an apparatus for measuring the rate of feed or rheometer 20 of a known type, by means of which the pilot can ascertain, at any time, the value of the rate of feed of oxygen, this rheometer being preferably graduated in altitudes so that, by comparison with the altimeter, the pilot can ascertain during flying, whether the apparatus is working normally.

On the other hand, the system preferably includes a throttling valve 21, having at least two positions at one of which the rate of feed is normal and corresponds with the amount of oxygen which the pilot requires when he is at rest, while at the other position, in which the throttling effect is very much reduced or even is practically nil, the pilot is supplied with the amount of oxygen which he requires when he is performing some special work which calls for a greater supply of oxygen. The rheometer 20 and valve 21 are connected with outlet pipe 12.

The various elements of the apparatus above described may be enclosed inside a casing A. The operation of this apparatus is believed to result clearly from the preceding explanations so that further description of this operation is unnecessary.

The apparatus according to the invention has many advantages over prior apparatus for the same purpose; for instance it is much more accurate and therefore affords full safety to the pilot. Furthermore, the consumption of oxygen is reduced to a minimum.

Figure 3:
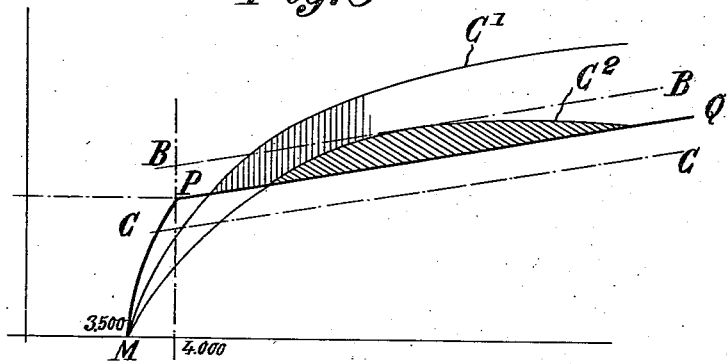
Fig. 3 is a diagram showing the variation of the rate of feed according to the altitude of the apparatus.

This last mentioned advantage results from the curves of Fig. 3, which show that the apparatus supplies exactly the necessary amount of oxygen while prior apparatus led to a waste of oxygen.

In Fig. 3, I have shown the altitudes in abscissae and the rates of feed in ordinates while the straight lines B—B and C—C limit a region in which the correct values of the rate of feed are to be found.

The apparatus according to the present invention operates in accordance with a curve of the rate of feed shown at MPQ which is obtained by a suitable shape of cam 18 or any equivalent means. This curve includes a substantially straight portion MP, which rises rapidly from point M, corresponding for instance to an altitude of 3,500 meters (that is to say the altitude from which an addition of oxygen becomes necessary) up to a point P, corresponding for instance to an altitude of 4,000 meters.

This portion MP of the curve corresponds to a quick increase of the rate of feed. Then, from point P, located in a region limited by lines B—B and C—C, the curve becomes a substantially straight line PQ, extending in the same direction as straight lines B—B and C—C. This portion PQ of the curve corresponds to the correct variation of the rate of feed in accordance with the change in altitude.

It follows that there is no waste of oxygen, while existing apparatus of the same kind operate accordingly to parabolic curves such as $C^1$ and $C^2$.

Now, curves such as $C^1$ pass closely to point P but they extend beyond the limits of region B—B, C—C, which corresponds to uselessly high rates of feed.

On the contrary, curves such as $C^2$ have a relatively long portion within this region, but they pass at too long a distance from point P, so that the rates of feed corresponding to the first part of the curve are much too low.

Preferably, the features above described are combined with the following arrangements:

According to one of these arrangements, instead of connecting the controlling means, that is deformable boxes 13 to valve 10 or its equivalent in a positive manner, a unidirectional connection is provided between these parts for combining said valve 10 with means whereby the pilot can control the valve 10 directly so as to obtain a rate of feed of oxygen higher than the normal rate of feed.

In the embodiment shown by way of example in the drawing, these connecting means include a cam 22 which is operated through a knob 23 and arranged to act on a lever 24 connected to rod 15, said lever 24 being connected in a unidirectional manner with the deformable boxes 13. Such unidirectional connection is made by forming the rod 15 with a thickened lower section and a reduced upper section with a shoulder between said sections. Lever 24 is slidably connected to the reduced section so that downward movement of said lever will press the lever against the shoulder and move rod 15 downwardly, while upward movement of lever 24 will not cause any movement of rod 15.

Figure 2:
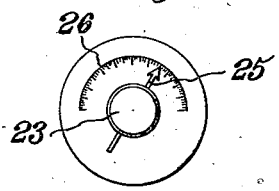
Fig. 2 is a front view of one of the control devices of this apparatus.

Furthermore, this cam 22 preferably cooperates with an indicating member 25 movable in front of a dial which is graduated in altitudes, as shown at 26 (Fig. 2). Accordingly, the scale of this dial 26 enables the pilot to mark the positions of the valve that must correspond to determined altitudes, under normal conditions.

According to another arrangement, means are provided for ascertaining at ground level, whether the apparatus is working properly and is truly capable of supplying the proper rates of feed corresponding to the various altitudes.

For this purpose, for instance, I provide means such as indicating member 25 and its graduated scale 26, just above described.

With these means I combine a rate of feed indicator the scale of which has been graduated by taking into account the correction to be made as a consequence of the fact that the apparatus is tested at the ground level, that is to say at the pressure of the surrounding fluid.

Preferably, for this purpose, I merely provide rheometer 20 with a second graduated scale graduated in altitudes, whereby, when the apparatus is being tested, its proper operation shall be shown by the fact that when pointer 25 indicates a certain altitude on scale 26, the pointer of the rheometer indicates the same altitude of the special graduated scale for verification purposes.

According to still another feature of the invention, the apparatus is provided with a by-pass 27, affording a direct communication between pipe 12, and pipe 4. Of course said by-pass is provided with a throttling device 28 ensuring an approximate rate of feed whereby the pilot is always supplied with oxygen, if the apparatus should not operate properly.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for the delivery of fluid from a source of fluid under pressure at a rate corresponding to the pressure of the surrounding atmosphere, which comprises, in combination, delivery means for the discharge of the fluid at the desired pressure, means for controlling the rate of flow of said fluid from said source to said delivery means, at least one structure deformable in response to variations of the pressure of the surrounding atmosphere, kinematic means for connecting said controlling means with said structure so as to operate said controlling means in response to variations of the pressure of the surrounding atmosphere according to a predetermined law, said kinematic means being arranged to act positively for only one direction of action of said controlling means, and manual means for directly operating said controlling means in said direction, said manual means including means for acting positively only in said direction for determining the position of said manual means relative to said controlling means.

2. An apparatus for the delivery of fluid from a source at a rate corresponding to the pressure of the surrounding atmosphere, which comprises, in combination, means for controlling the rate of flow of said fluid from said source, means deformable in response to variations of the pressure of the surrounding atmosphere for actuating said controlling means, manual means for operating said controlling means and for rendering said deformable means inoperative in such a manner as to increase the rate of feed above the amount determined by said deformable means, and indicative means for determining the position of said manual means relative to said control means.

3. An apparatus for regulating the dispensing of fluid under pressure and at different altitudes comprising conduit means for supplying fluid under pressure to and through said apparatus, a valve in said conduit means, lever means including an altitude scale for operating said valve to pass fluid through said conduit at a predetermined rate according to the altitude indicated upon said scale, and a flow meter connected to said conduit means, said meter including a scale calibrated to show at ground level the altitudes of said altitude scale whereby the rate of actual flow of fluid through said apparatus can be measured at ground level upon said flow meter for any altitude shown by said altitude scale.

4. An apparatus as in claim 3, a second scale upon said flow meter calibrated to indicate in terms of altitude the rates of flow of fluid in said conduit means at the altitudes corresponding to the altitudes shown by said altitude scale.

5. An apparatus for regulating the dispensing of fluid under pressure and at different altitudes comprising means for supplying fluid under pressure to and through said apparatus, regulating means including an indicator for adjusting the rate of flow of said fluid through said apparatus for any given altitude, and means calibrated for a second altitude and including a second indicator to show in the terms of said given altitude the actual rate of flow of said fluid at said second altitude through said apparatus for any corresponding position of said regulating means whereby the accuracy of the apparatus for operation at said given altitude can be verified at said second altitude by comparing the values indicated by said indicator and said second indicator.

6. An apparatus for regulating the delivery of fluid under pressure into widely varying atmospheric pressures comprising means for supplying fluid to and through said apparatus, means automatically responsive to change in atmospheric pressure for varying the rate of flow of fluid through said apparatus, regulating means, including a scale, operable in one direction only for modifying the position of said automatic means, and flow meter means including a second scale for ascertaining at one atmospheric pressure and in the terms of a second atmospheric pressure, the actual rate of flow through said apparatus when said regulating means is positioned to regulate flow at said second atmospheric pressure.

JACQUES GUSTAVE MÉJEAN.